United States Patent [19]

O'Connor

[11] 4,037,811
[45] July 26, 1977

[54] VERTICAL CONTROL FOR INSTRUMENT SUPPORT STRUCTURE

[76] Inventor: Chadwell O'Connor, 2024 Galaxy Drive, Newport Beach, Calif. 92660

[21] Appl. No.: 644,141

[22] Filed: Dec. 24, 1975

[51] Int. Cl.² ............................................. F16M 11/00
[52] U.S. Cl. ..................................... 248/162; 248/400; 248/404
[58] Field of Search .......................... 108/144, 146–148; 188/300; 248/400, 162, 404, 411, 413, 414, 161, 297, 354 H, 188.4, 188.5, 405, 406, 123; 297/338, 339, 345, 347, 348

[56] References Cited

U.S. PATENT DOCUMENTS

| 1,450,329 | 4/1923 | Morgan ..................... 248/354 H UX |
| 1,651,506 | 12/1927 | Berninghaus ......................... 248/404 |
| 2,012,628 | 8/1935 | Howell ................................ 248/123 |
| 2,484,982 | 10/1949 | Coutant ............................... 248/404 |
| 3,036,844 | 5/1962 | Vogel ............................ 248/400 UX |
| 3,147,946 | 9/1964 | Hale ..................................... 248/404 |
| 3,682,424 | 8/1972 | Strumpell ............................ 248/162 |
| 3,850,395 | 11/1974 | O'Conner ............................. 248/171 |

FOREIGN PATENT DOCUMENTS

| 241,740 | 12/1964 | Austria .................................. 108/144 |
| 1,351,922 | 12/1963 | France ............................. 248/354 H |
| 1,070,311 | 2/1954 | France ............................. 248/354 H |
| 391,954 | 5/1933 | United Kingdom ................. 297/339 |
| 638,392 | 6/1950 | United Kingdom ................. 248/161 |
| 1,197,187 | 7/1970 | United Kingdom ................. 297/345 |

Primary Examiner—Lawrence J. Staab
Attorney, Agent, or Firm—Leydig, Voit, Osann, Mayer & Holt, Ltd.

[57] ABSTRACT

An instrument support structure having a post vertically telescoped in a column and an interfitted cylinder and rod within the post defining a hydraulic piston connecting the post and the column. A hydraulic reservoir is mounted on the column, is in fluid communication with the piston, and is pressurized so as to exert a force balancing the weight on the post. Pressurization is by air through a common tire valve so that various weights can be selectively balanced. An adjustable fluid valve controls the rate of fluid movement to and from the piston so as to hydraulically lock the post or adjustably control the rate at which a force can reposition the post. A spring biased shoe holds the post against walls in the column, and a threaded lock element enables the shoe pressure to be increased to mechanically lock the parts.

5 Claims, 3 Drawing Figures

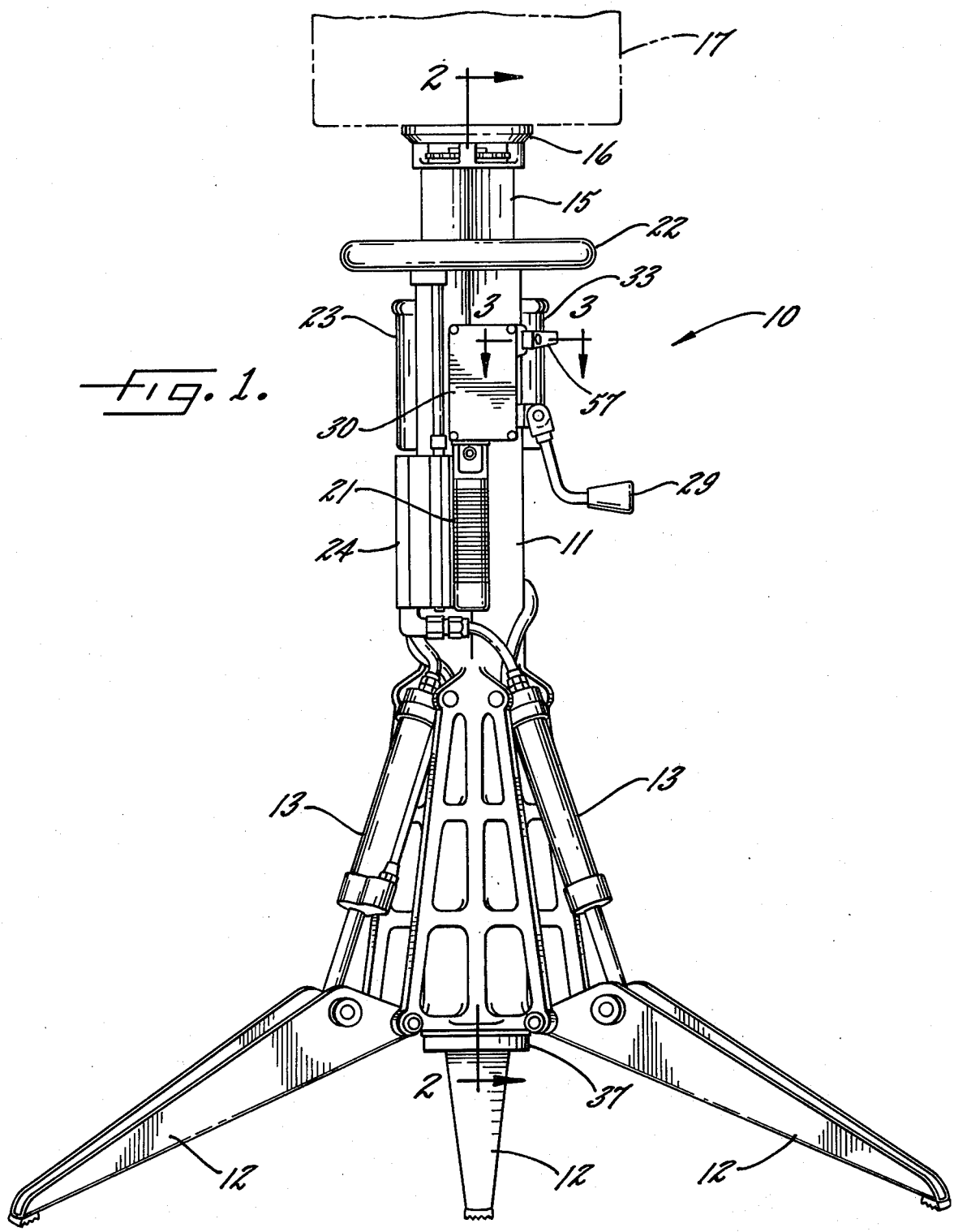

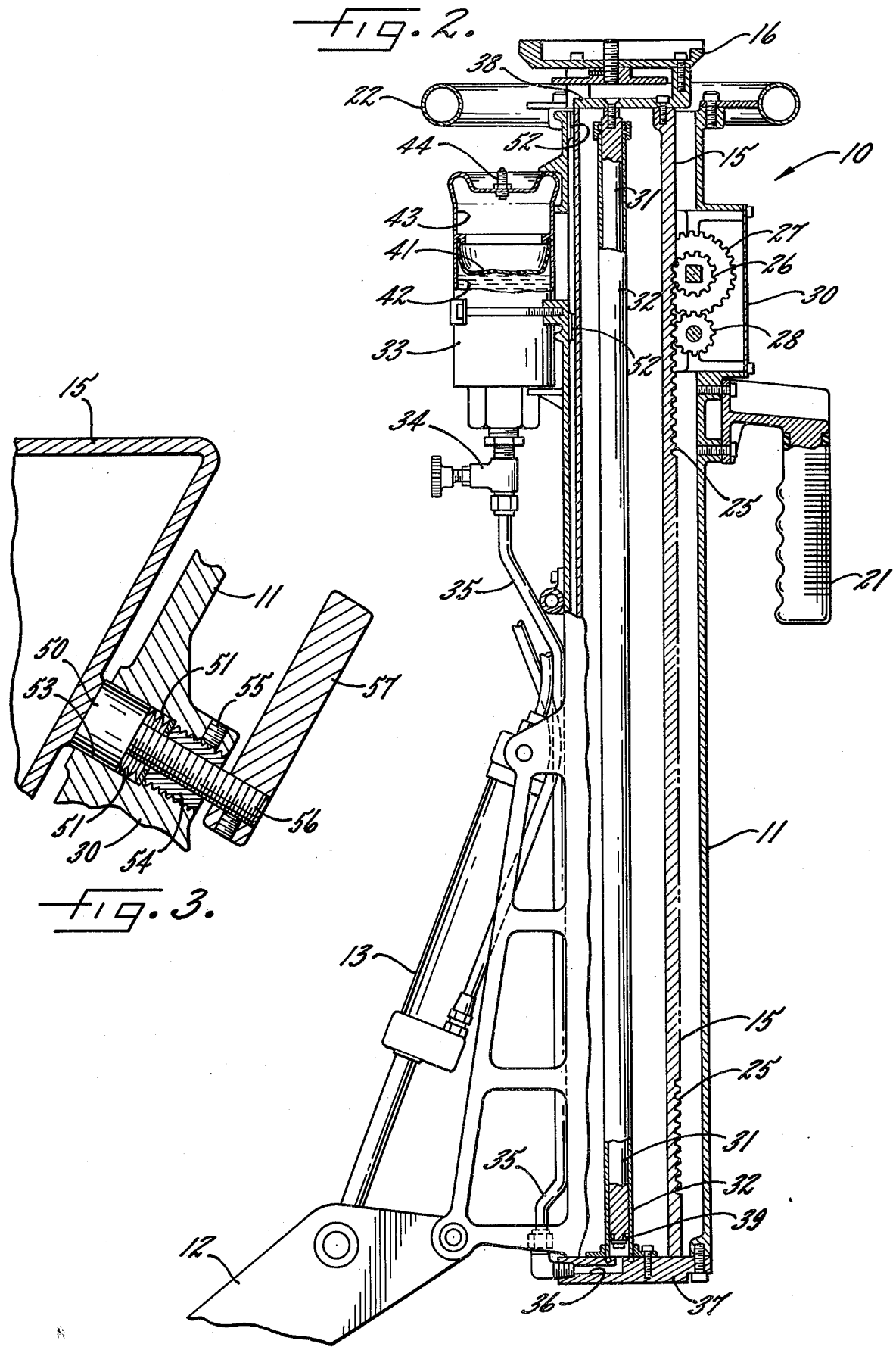

VERTICAL CONTROL FOR INSTRUMENT SUPPORT STRUCTURE

This invention relates generally to support structures for instruments such as motion picture and television cameras, and more particularly concerns a control for vertical adjustment of such structures.

A camera is conventionally supported on a tripod. In U.S. Pat. No. 3,722,847, issued Mar. 27, 1973, there is disclosed an instrument support structure that performs the support function of a tripod together with other functions not normally associated with conventional tripods. One aspect of that structure is the provision of a vertically adjustable telescoping column and post permitting the height of the camera or other instrument to be set relative to the underlying surface.

An object of the present invention is to provide a control arrangement for a vertically adjustable instrument support structure that can counterbalance, and in effect make weightless, supported instruments of a wide range of sizes and weights.

Another object is to provide a control arrangement of the above kind that can also be readily adjusted to smoothly control vertical movement of a supported instrument. In more detail, vertical movement can be controlled to a sufficient smoothness to make it entirely feasible to continue operation of a camera as it is vertically adjusted without producing uncomfortable "jumping" of the resulting pictures.

A further object is to provide a control arrangement as characterized above that will readily and securely lock the support structure in vertically adjusted position.

An overall object is to provide a control arrangement of the above character that is rugged and reliable, and yet relatively simple in design so as to be economical to manufacture and maintain.

Other objects and advantages of the invention will be apparent upon reading the following detailed description and upon reference to the drawings, in which:

FIG. 1 is a perspective of an instrument support structure embodying the present invention;

FIG. 2 is an enlarged, partial section of the instrument shown in FIG. 1 taken along the line 1—1; and FIG. 3 is a fragmentary, greatly enlarged section taken along the line 3—3 in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown an instrument support structure 10 embodying the invention and including a column 11 supported on pivoted legs 12 adjustably held in position by hydraulic actuator struts 13. The column 11 is triangular in cross section and slidably supports a vertically adjustable post 15, which is also triangular in cross section, and on which is mounted a tie-down plate 16 for an instrument 17 or a panhead that would support an instrument.

The column 11 mounts a carrying handle 21 and a handling ring 22. A reservoir 23 of hydraulic fluid under pressure and a control valve 24 permit collapsed folding of the legs 12, extension of the struts 13 to swing the legs to their illustrated support positions, tilting of the column 11 relative to the legs 12 in the event they rest on uneven ground, and rigid locking of the struts 13 and thus the legs 12 relative to the column 11. Details of such hydraulic systems can be seen in U.S. Pat. Nos. 3,722,847 and 3,850,395.

For vertically adjusting the post 15 in the column 11, one edge of the triangular post is formed as a gear rack 25 which is meshed with a pinion 26 driven by gears 27 and 28 and a foldable handle 29. The pinion 26 and the gears 27, 28 are enclosed in a housing 30 formed on the column 11.

In accordance with the invention, the post 15 and whatever instrument 17 is mounted on the post are counterbalanced by a piston rod 31 and a cylinder 32 positioned within the post 15 and supplied by hydraulic fluid, under pressure, from a reservoir 33 at a rate controlled by a valve 34. Preferably, the reservoir 33 is a metal bottle clamped to the column 11 and connected by a fluid line 35 to a passage 36 in a column base plate 37 to which the cylinder 32 is secured. The piston rod 31 is a long solid cylindrical rod fixed to a cover plate 38 on the post 15. A piston gasket 39 is fixed to the end of the rod 31.

The reservoir 33 is of the type having a flexible membrane 41 dividing a fluid containing chamber 42 from a gas pressure chamber 43, and a conventional tire-type of air valve 44 permits the chamber 43 to be pressurized to a valve effective to generate that hydraulic pressure in the cylinder 32 needed to counterbalance the weight of and on the post 15. With a little empirical experience, the user of the support structure 10 will know a given psi of air pressure in the chamber 43 will effectively counterbalance a given camera or other piece of equipment.

With the instrument 17 counterbalanced, there is virtually no load on the handle 29 and its associated gearing, and the post 15 can be smoothly cranked up and down. If the valve 34 is shut, there will be a hydraulic lock against further downward movement of the post 15. If the valve 34 is fully opened, the post 15 can be quickly raised or lowered. If the valve 34 is partially opened, the fluid flow rate into and out of the reservoir 33 will be modulated, imposing a soft resistance limiting post movement to constitute, literally, a hydraulic dampener controlling vertical movement of the post. As a result, smooth dampened vertical movement of the post 15 can be readily attained making it entirely feasible to continue operation of a camera on the structure 10 without producing uncomfortable "jumping" of the camera picture.

Since the cylinder 32 and the piston 31 are of small diameter relative to the column 11 and the post 15, the latter can be of adequate cross section to remain rigid under the intended loads, and the smaller sectioned cylinder and piston can extend the full range of post-column movement without requiring a great volume of fluid in the reservoir 33.

To prevent wobble of the post 15 in the column 11 during relative vertical movement, a shoe 50 (see FIG. 3) is mounted in the column 11 and biased by a series of Belleville springs 51 against one flat side of the post 15 so as to urge the other two flat post sides snugly against internal wall surface 52 on the column 11. In the illustrated embodiment, the shoe 50 is fitted in a passage 53 in the housing 30, and a threaded plug 54 is adjustably locked by a set screw 55 in the passage 53 to control the spring pressure on the shoe 50. For mechanically locking the post 15 against sliding movement in the column 11, an element 56 is threaded in the plug 54 and provided with a hand lever 57. Slight rotation of the lever 57 will drive the element 56 against the shoe 50 so as to firmly lock the post 15 against the column surfaces 52.

It can be seen that the control system for the support structure 10 is rugged and reliable, being relatively simple in design so as to be economical to manufacture and maintain.

I claim as my invention:

1. In an instrument support structure having a column intended to be vertically disposed and a post slidably fitted for telescoping movement in the column, the combination comprising, a cylinder mounted in the lower end of said column and extending up into said post, a rod fixed to the upper end of said post and being slidably fitted in said cylinder, a hydraulic reservoir fitted on said column and being in fluid communication with the lower end of said cylinder, means for establishing and maintaining a variable pressure on said fluid so as to exert a force on said rod counterbalancing the weight of and on said post, said cylinder and rod being interfitted through a length at least as long as the full range of movement of said post in said column, and a crank mounted on said column and geared to said post for vertically moving the counterbalanced post in the column.

2. The combination of claim 1 including an adjustable fluid valve 34 between said reservoir and said cylinder which, when closed, will hydraulically lock the post in said column and, when opened, will control the flow rate of fluid to and from said cylinder so as to smoothly and variably limit the rate at which the post can be moved in the column.

3. The combination of claim 1 in which said means is an air chamber in said reservoir which can be externally pressurized to a pressure level that will counterbalance a desired load on said post.

4. The combination of claim 1 in which said post and said column are triangular in cross section, and the combination includes a shoe 50 mounted in said column and being resiliently biased against one flat side of said post so as to urge the other two flat post sides snugly against internal surfaces of the column so as to eliminate wobble of the post in the column.

5. The combination of claim 4 including a mechanical locking element threaded in said column so as to bear on said shoe, whereby rotation of said element will cause said shoe to press said post into rigid locking engagement with said column.

* * * * *